April 19, 1955   J. ZABEL   2,706,323
FUR SHEARING AND CUTTING MACHINE
Filed Feb. 6, 1953
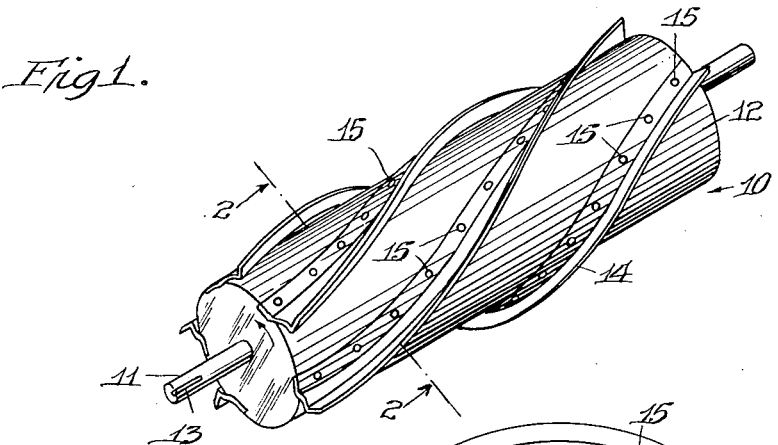
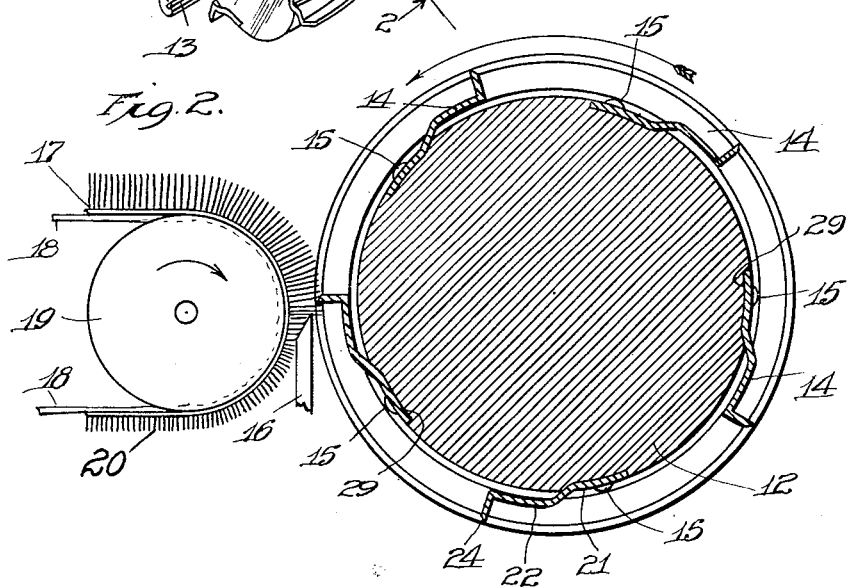
INVENTOR.
Jacob Zabel
BY
his ATT'YS.

United States Patent Office 2,706,323
Patented Apr. 19, 1955

2,706,323
FUR SHEARING AND CUTTING MACHINE

Jacob Zabel, Newark, N. J.

Application February 6, 1953, Serial No. 335,578

10 Claims. (Cl. 26—15)

The present invention relates to fur shearing or cutting machines, and more particularly to improvements in the rotary knife used in shearing machines of this type.

Fur shearing or cutting machines of this type are used for cutting part of the hair from hides and pelts to obtain hair suitable for use in the manufacture of felt and for other purposes where such hair is utilized.

The rotary knife of the present invention may also be used advantageously in fur shearing machines, in which it is desired to shear all of the hair on a belt to uniform length.

A shearing machine of this character ordinarily comprises a rotary knife with elongated helical blades and a stationary bedknife which engages the blades, the fur being fed to the bedknife by suitable delivery mechanism so that the hair is removed by the blades of the rotary knife. In conventional shearing machines, the helical blades of the rotary knife are rigidly fixed to a knife cylinder and extend radially outwardly therefrom. There is little or no resiliency provided in the blades of the rotary knife. Furthermore, the useful life of the blades is shortened, their operating temperature is raised by frictional heat, and the interval between successive sharpenings of the knife blades is materially reduced. Moreover, in the event that some hard object should come between the bedknife and the rotary knife, breakage of a blade or other serious damage will almost invariably occur.

An object of the invention is to provide an improved cutting blade for the revolving knife cylinder of a fur cutting or shearing machine.

A further object of the invention is to provide a resilient cutting blade which will not be damaged if a hard object should be caught between the cutting blade and the bedknife.

Still another object of the invention is to provide a resilient helical cutting blade of this character which, by reason of its resiliency, maintains an even pressure moving progressively along the full length of the bedknife, notwithstanding uneven wear resulting from the cutting operation.

Another object of the invention is the provision of a resilient cutting blade which has a tendency to be self-sharpening.

Still another object of the invention is to provide a rotary knife construction in which the knife blades extend generally tangentially from the knife cylinder so that the screws or other fastening means holding the blades to the cylinder will be stressed substantially only in shear. In this way, the stress accompanying the cutting operation, and particularly under circumstances where a hard object enters the cutting mechanism, the tendency to strip the threads of the screws which secure the blades to the rotary knife cylinder will be minimized. The resulting stress will be applied as a shearing force tending to cut the screws. The screws may thus be of any desired diameter or material, either to withstand severe stresses, or to shear off whenever the shearing stress is great enough to cause damage to the cutting blades or the bedknife.

Another object of the invention is the provision of a preferred form of rotary knife which is generally L-shaped in cross section, the shorter leg of the L extending radially outwardly from the knife cylinder, and the longer leg extending generally tangentially with respect to the knife cylinder. The end of the longer leg of the L abuts against a shoulder formed in the periphery of the knife cylinder, the blade being sufficiently resilient to permits its movement inwardly toward the knife cylinder. The end of the shorter leg of the L is sharpened to provide a cutting edge, particularly where it is desired to remove a maximum amount of hair from the pelt.

A further object of the invention is to provide a rotary knife construction in which the cutting edge of the knife blade is drawn past the bedknife, trailing the resilient portion thereof, so that the body of the blade is stressed principally in tension accompanied by a bending stress applied to the flexed resilient portion of the blade.

Other and further objects will become apparent upon reading the following specification together with the accompanying drawing forming a part hereof.

Referring to the drawing:

Figure 1 is a perspective view of a revolving knife embodying the invention.

Figure 2 is an enlarged transverse sectional view taken along the line 2—2 of Figure 1 and in addition showing the conveyor and stationary cutting blade.

Referring to Fig. 1, the rotary knife designated generally as 10, comprises a shaft 11 upon which is fixedly mounted a blade carrying knife cylinder 12. The shaft 11 is adapted to be mounted in a fur shearing or cutting machine of any desired type and the shaft 11 is illustratively shown provided at one end thereof with a keyway 13 for driving engagement with gearing or any other suitable driving means.

Evenly spaced about the external surface of the cylinder 12 are a plurality of helical cutting blades 14 secured to the cylinder 12 by suitable fastening means illustratively shown as screws 15.

As may best be seen in Fig. 2, when the cylinder 12 is mounted in a shearing machine, the blades 14 are disposed for cutting engagement with a stationary bedknife 16. The fur to be sheared 17 is carried on a conveyor belt 18 which passes over a roller 19, presenting the hairs of the fur to the cutting mechanism. The end portions of the hairs of the fur which are to be sheared off, project over the upper edge of the bedknife 15 and are sheared by the revolving blades 14, the sheared pelt 20 being carried away by the same conveyor belt 18 at its under side.

Each of the elongated helical blades 14 comprises a straight portion 21 which is held by a helical row of the screws 15 and is located in a cooperating helical elongated longitudinal recess 29 in the periphery of cylinder 12, so that the outer surface of the straight portion 21 is substantially flush with the outer peripheral surface of the cylinder 12. A resilient spring portion 22 extends outwardly from the straight portion 21 and its inner surface is spaced from the outer peripheral surface of the cylinder 12, being generally curved with a radius of curvature somewhat greater than the radius of curvature of the cylinder 12. The resilient spring portion 22 of the blade 14 terminates in a radially outwardly extending cutting portion 23 which is ground at 24 to provide a cutting edge.

The ground edge at 24 is beveled so that when the cylinder 12 is rotated in the direction indicated by the arrow, the cutting edge of the blade 14 will be cleanly presented to the cutting edge of the bedknife 16 by the action of the spring portion 22, the cutting edge at 24 trailing the resilient portion 22 of the blade 14 as it passes the bedknife 16. In the event that some hard substance, such as a light piece of metal, for example, should be imbedded in the fur and should be presented to the cutting blades 14, the cutting edge of the blade will be pressed radially inwardly away from the bedknife 16 without damage to either the blade 14 or the bedknife 16, the screws 15 being stressed principally in shear, except for the tension resulting from flexure of the resilient portion 22 of the blade.

It should also be noted that the resiliency of the blade 14 causes it to bear with substantially constant cutting pressure progressively against the entire length of the bedknife 16, notwithstanding small dimensional changes caused by wear, temperature variations or similar factors. This is not true in the case of a radially extending or a rigid cutting blade of conventional type where minute dimensional changes will interfere seriously with the desired cutting action.

The resilient engagement between the cutting blade and the bedknife also tends to make the blade self sharpening and to greatly increase the amount of service from the blade before regrinding of the cutting edge becomes necessary.

I claim:

1. A rotary knife of the class described adapted for cutting engagement with a fixed bedknife, comprising: a knife cylinder having a plurality of peripheral longitudinal helical recesses formed therein; a plurality of cutting blades disposed in said recesses and extending generally tangentially from said cylinder, each blade comprising a portion secured in one of said recesses and an outwardly extending resilient portion spaced from said cylinder, said resilient portion terminating in an outwardly extending portion sharpened at its end to provide a cutting edge adapted for engagement with said bedknife.

2. A rotary knife according to claim 1, wherein said outwardly extending terminating portion extends substantially radially outwardly with respect to said cylinder.

3. A rotary knife according to claim 1, wherein said resilient portion is curved with a radius of curvature greater than the radius of curvature of said cylinder.

4. A rotary knife according to claim 1, wherein said cutting edge is beveled with respect to the direction of rotation of said cylinder to engage said bedknife with increasing pressure.

5. A rotary knife according to claim 1, wherein said cutting portion trails said resilient portion as it engages said bedknife.

6. A rotary knife of the class described, and adapted for engagement with a fixed bedknife, comprising: a knife cylinder having elongated peripheral helical recesses formed therein and extending longitudinally thereof; a plurality of helical cutting blades secured in said recesses by fastening means and projecting outwardly therefrom, each blade comprising a resilient spring portion spaced from said cylinder and formed integrally with said blade, said spring portion terminating in an outwardly extending portion engageable with said bedknife, said outwardly extending portion being sharpened at its free end to form a cutting edge.

7. A rotary knife according to claim 6, wherein said outwardly extending terminating portion extends substantially radially outwardly with respect to said cylinder.

8. A rotary knife according to claim 6, wherein said resilient portion is curved with a radius of curvature greater than the radius of curvature of said cylinder.

9. A rotary knife according to claim 6, wherein said cutting edge is beveled with respect to the direction of rotation of said cylinder to engage said bedknife with increasing pressure.

10. A rotary knife according to claim 6, wherein said cutting portion trails said resilient portion as it engages said bedknife.

References Cited in the file of this patent

UNITED STATES PATENTS

| | | |
|---|---|---|
| 1,732,323 | Zabel | Oct. 22, 1929 |
| 1,832,717 | Marble | Nov. 17, 1931 |

FOREIGN PATENTS

| | | |
|---|---|---|
| 28,106 | Great Britain | of 1903 |